United States Patent
Coersmeier et al.

(10) Patent No.: US 7,796,951 B2
(45) Date of Patent: Sep. 14, 2010

(54) DETECTION OF LIGHTNING

(75) Inventors: Edmund Coersmeier, Bochum (DE); Joni Jantunen, Helsinki (FI); Martin Kosakowski, Bochum (DE); Stefan Mende, Recklinghausen (DE); Yuhuan Xu, Bochum (DE)

(73) Assignee: Nokia Corporation, Espoo (FI)

( * ) Notice: Subject to any disclaimer, the term of this patent is extended or adjusted under 35 U.S.C. 154(b) by 1300 days.

(21) Appl. No.: 11/251,437

(22) Filed: Oct. 14, 2005

(65) Prior Publication Data

US 2007/0087697 A1    Apr. 19, 2007

(51) Int. Cl.
*H04B 17/00* (2006.01)
(52) U.S. Cl. .............. 455/67.13; 455/66.1; 455/226.1; 455/552.1
(58) Field of Classification Search ........... 455/67.13, 455/3.02, 3.01, 67.11, 66.1, 73, 550.1, 226.1, 455/154.1, 552.1, 77, 551, 556.1, 226.4; 702/4; 342/72

See application file for complete search history.

(56) References Cited

U.S. PATENT DOCUMENTS

| 5,541,501 A * | 7/1996 | Shaver et al. ............... 324/72 |
| 7,342,504 B2 * | 3/2008 | Crane et al. ................. 340/612 |
| 2003/0227985 A1 * | 12/2003 | Schill et al. .................. 375/340 |
| 2004/0166817 A1 * | 8/2004 | Mokhtari et al. .............. 455/91 |
| 2005/0088648 A1 * | 4/2005 | Grace et al. .................. 356/318 |
| 2005/0197070 A1 * | 9/2005 | Kaikuranta et al. ....... 455/67.13 |
| 2006/0106540 A1 * | 5/2006 | Campbell ...................... 702/4 |

* cited by examiner

*Primary Examiner*—John Lee
(74) *Attorney, Agent, or Firm*—Harrington & Smith (57) ABSTRACT

A lightning detector for lightning detection and a lightning detection method, wherein the lightning detector includes a Digital Radio Mondiale (DRM) digital broadcasting system receiver having an analog front-end and a digital base-band; wherein with the analog front-end DRM receiver the radio signal from lightning can be detected when a DRM receiver application and a lightning detection application operate in the same AM band application engine.

24 Claims, 7 Drawing Sheets

DETECTION OF LIGHTNING

FIELD OF THE INVENTION

The invention relates to a lightning detector. The invention also relates to a method for detecting lightning.

BACKGROUND OF THE INVENTION

Thunderstorms are a major weather hazard, but are difficult to predict. They can travel at speeds of 20 km/h to 40 km/h, and lightning strokes may occur more than 10 km in front of the rain clouds and equally some distance behind the rain clouds. While a lightning stroke is produced by a cloud or a weather front, many of the most dangerous lightning strokes actually occur when no visible clouds are present above as a warning of a thunderstorm. Thus, a system that warns of possibility harmful thunderstorms, even if only approximately ten minutes before they become visible, can be considered a major safety feature.

There is a large population that would benefit from such a safety feature. To some persons, it might provide only a nice-to-know everyday knowledge. To a considerable number of persons, however, storm and lightning originated threats have significant implications in the form of an increased risk, loss of property or even fatal consequences. A lightning alerting system is of particular interest, for instance, for persons spending much time outdoors, and equally for aviators, navigators or the like. A system providing a warning of lightning even when the weather seems to be perfectly calm and clear may enable a person to take suitable safety measures in time, for instance to seek shelter etc.

From the state of the art, many single-purpose lightning detectors are known, but they have some disadvantages from a commercial perspective. Scientific lightning detectors, which are used in meteorology, are very large and their range is hundreds of kilometers.

Also other high-end lightning detectors using a single radio frequency (RF) band are large and relatively expensive, compared for instance to mobile phones. Moreover, they are usually required to have a specific orientation, for instance standing on a wall or on a desk stand, in order to gain the required accuracy or directionality. They are thus not well suited for a truly mobile use. These devices typically have further to be vertically positioned and held stable for several minutes before a reliable detection of a thunderstorm becomes possible.

In addition, there are now existing rather inexpensive lowend lightning detectors which are completely portable in size and which do not require a specific orientation. These detectors, however, are extremely susceptible to electromagnetic compatibility (EMC) emissions and thus tend to cause spurious alarms especially in an urban setting or near highways.

Currently most of commercially available mobile lightning detectors detect lightning strokes by measuring the electromagnetic emission caused by lightning at very low frequencies (VLF: 3 to 30 kHz). In addition, it has been known for decades that lightning strokes can be "heard" by using a traditional AM broadcast radio receiver, which operates at longwave frequencies (150 to 300 kHz) and medium wave frequencies (500 to 1700 kHz). However, numerous publications exist where lightning have been detected and measured by its emission at HF and VHF frequencies between 3-300 MHz and even at higher (UHF) frequencies.

SUMMARY OF THE INVENTION

Figure 2:
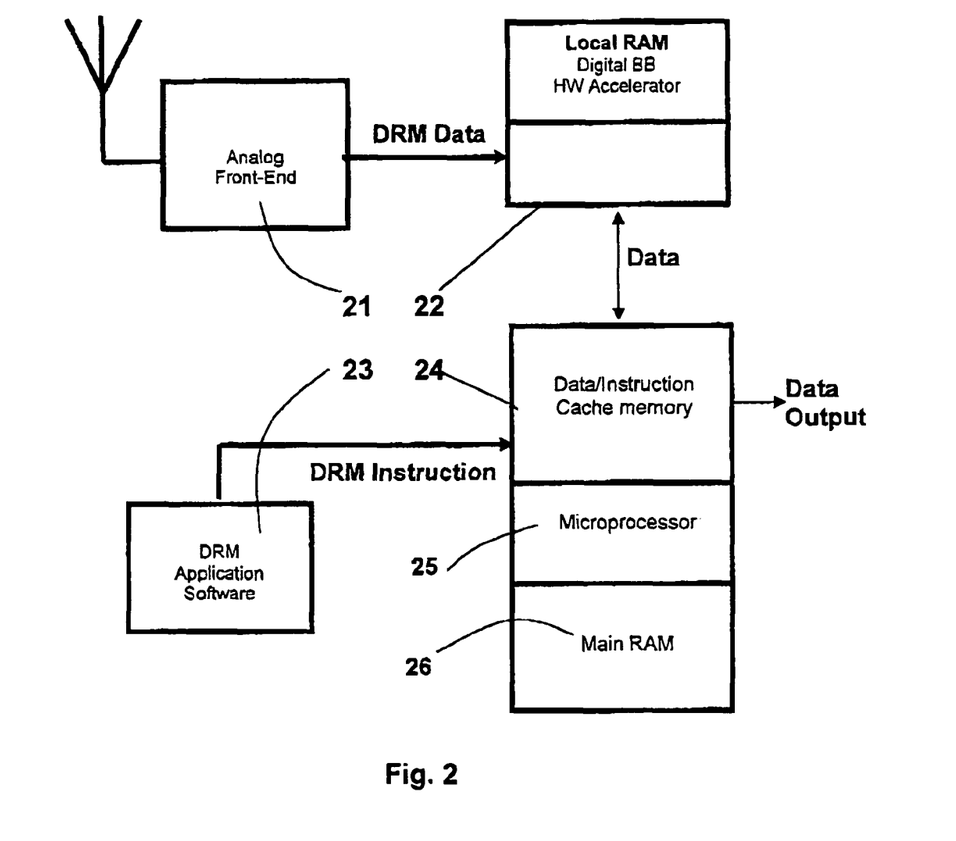
FIG. 2 shows an architecture of a digital base-band DRM receiver.

Digital Radio Mondiale (DRM) is a digital broadcasting system designed to be used within AM (Amplitude Modulated) long wave, medium wave and short wave (SW: 2 to 30 MHz) broadcasting bands. The DRM signal is designed to be able to fit in the existing AM broadcast frequency allocation plan in the 150 kHz to 30 MHz frequency range. To receive a signal from the DRM broadcaster, the receiver uses an analog front-end and a digital base-band part. The digital base-band part of the receiver comprises a processor controlled hardware accelerator for complex signal processing tasks. The architecture of a typical DRM receiver is depicted in FIG. 2. The whole AM band receiver system can be integrated on a single chip which can be embedded into a mobile RF device, especially a mobile telecommunication terminal.

With the analog front-end available within a DRM receiver ASIC, the radio signal from a distant lightning event can be received by the analog front-end and analyzed by the base-band signal processing part in order to forecast thunderstorms.

The present invention is based on a new architecture to combine a DRM broadcast AM receiver and a lightning detector that can preferably be integrated to a mobile RF device, especially a mobile telecommunication terminal.

In the present invention a flexible AM DRM front-end and a base-band architecture makes it possible for a DRM receiver and a lightning detection application to operate in the same AM band application engine. The DRM receiver uses the analog front-end, a digital hardware acceleration and a processing means, typically an ARM (Advanced RISC Machines) microprocessor or a similar embedded microprocessor core. The lightning detector uses the analog front-end as well as a software application for the processing means.

With the present invention cost reduction can be achieved: by using a single AM band engine for both applications these two AM band applications can run on a single AM band architecture.

BRIEF DESCRIPTION OF THE DRAWINGS

FIG. 4 presents DRM receiver digital base-band operations to exemplify how a DRM algorithm can be implemented in a DRM receiver, FIG. 5 corresponds to FIG. 4 and presents partitions of the DRM algorithms into hardware and software, wherein if the lightning application gets active the hardware blocks are set into a sleep mode as long as they are not necessary for the lightning application, and wherein the DRM software is replaced by the lightning software and the processing means operates without an additional hardware acceleration.

DETAILED DESCRIPTION OF THE INVENTION

In the present invention two AM band applications, a DRM receiver and a lightning detection can be implemented using a single HW engine. Software for an embedded processor, typically an ARM based processing means, is utilized for both applications.

Figure 1:
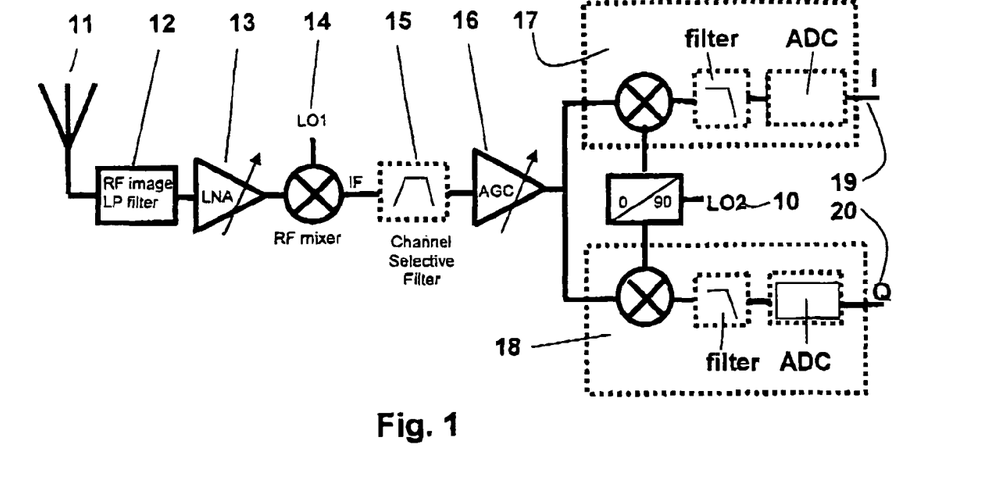
FIG. 1 presents a block diagram of an analog front-end of a DRM receiver.

A DRM receiver according to FIG. 1 is designed for the integration in mobile devices and contains an analog front-end and a digital base-band. The front-end is capable of receiving AM signals up to 30 MHz.

FIG. 1 presents a typical DRM receiver analog stage comprising antenna 11, input image preventing low pass (LP) filter 12, a low noise amplifier (LNA) 13, the gain of which can be adjusted, a RF mixer 14 to downconvert the input signal with the help of a first local oscillator (LO) frequency 14 designated as LO1, in order to selectively pass the selected channel through the channel filter 15 and via an Automatic Gain Controlling (AGC) stage 16 to the two I/Q mixers, controlled by a second local oscillator designated LO2 with quadrature outputs for the I and Q branch mixers. The mixers further have filters between their respective outputs and the inputs of the respective base-band ADC converters. These converters, typically fast delta-sigma ADC converters, output the digital I and Q output signals 19 respective 20.

The two branches, the in-phase branch 17 and the quadrature branch 18 in FIG. 1 can be used separately for lightning detecting purposes. Traditionally in RF systems, information is coded into the RF signal by using a modulator for the selected modulation method. During reception the information is decoded in a compatible demodulator. The in-phase and quadrature-phase branches operate similarly and will ideally completely exclude the local oscillator signal LO2 generated by the local oscillator 10 from any of the branch signals. The frequency, filtering and gain are conventionally the same in both branches in order to preserve the phase information.

In a electromagnetic signature received from lightning, there is no phase information in the signal. Lightning detection can be made on the basis of signal spectrum, signal magnitude or on signal envelope shape. Therefore it is possible to use I and Q branches of the receiver configured differently, i.e. the receiver can be modified so that the lightning detector utilizes two channels which each detect different characteristics of the signal.

Using the two branches with different gain settings makes it possible to obtain a larger dynamic range for lightning detection. This is important because the magnitude of the electromagnetic signature of a lightning strike is difficult to predict. For example, the amplitude ratio between emissions from lightning strikes to ground and emissions from intra-cloud strikes decreases significantly when the frequency increases from 3 kHz to 1 MHz. At a frequency of 3 kHz the ratio is between 20 and 40 but above 1.5 MHz this amplitude ratio is about 1. For this reason detection on two significantly different frequencies (e.g. 10 kHz and 1 MHz) enables separation of ground and intra-cloud strikes by comparing the amplitudes received on the different frequencies.

Figure 10:
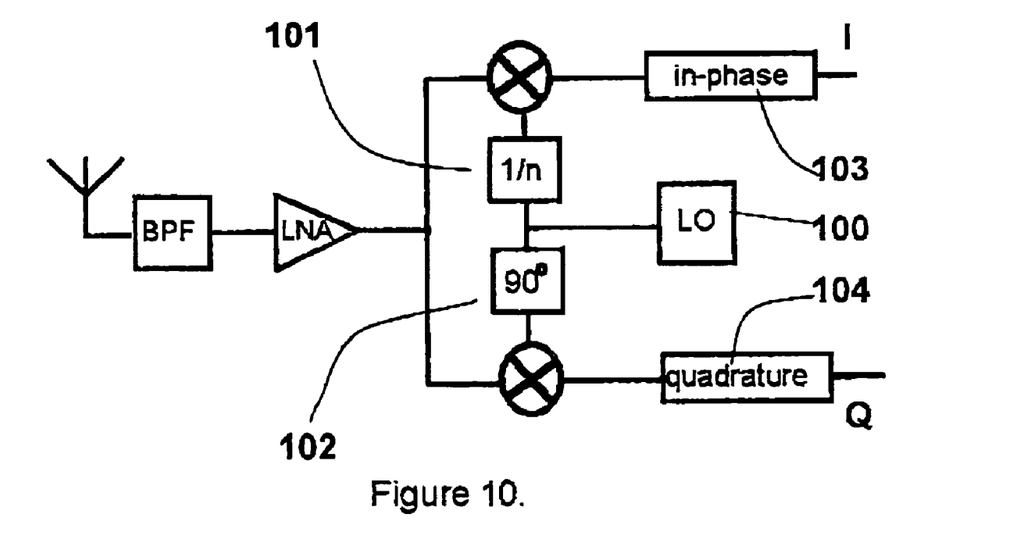
FIG. 10 presents an I/Q modulator operating in two modes.

The block schematic of FIG. 10 shows how a typical I/Q demodulator can be used to detect lightning strokes on two significantly different frequencies. The in-phase 103 and the quadrature branch 104 of the I/Q demodulator process different frequency bands of the AM frequency range, simply by adjusting the frequency of the local oscillator LO signal 100 with the help of a divider stage 101 before clocking the I branch mixer. The quadrature Q branch receives the original local oscillator signal frequency, although phase shifted 90 degrees as customary in a phase shifter 102 before it is used to clock the Q branch mixer. Although the I branch is shown as having a divider, it could as well be the Q branch or both. When not used for lightning detection these dividers can either be bypassed or adjusted to divide using the same divisor.

Figure 11:
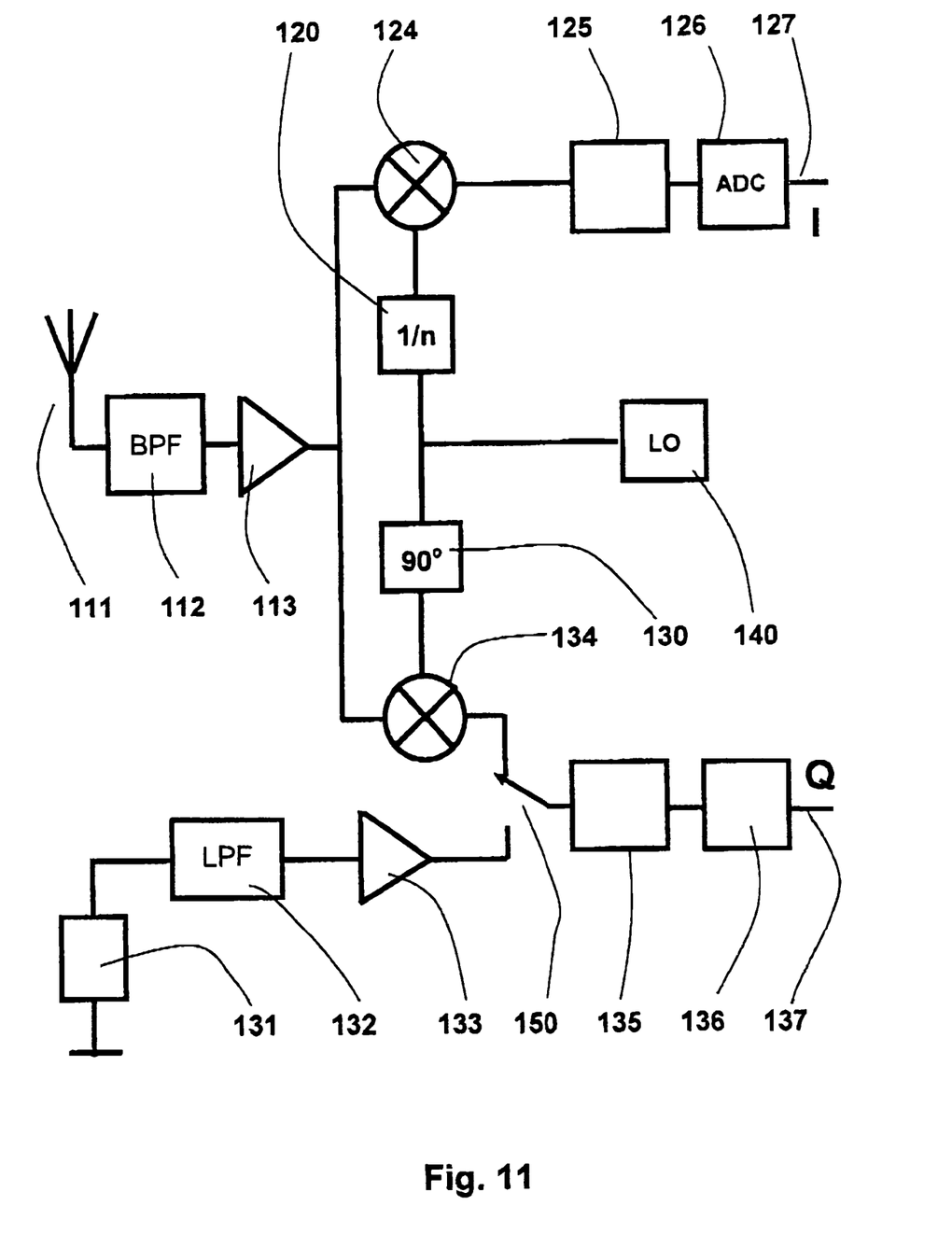
FIG. 11 presents lightning detection using two antennas.

This arrangement is exemplified by FIG. 11 showing the same basic arrangement as in FIG. 10 with an antenna 111, band pass filter 112, low noise amplifier 113 and the in-phase and quadrature mixers 124 respective 134 driven by a local oscillator 140 as described earlier. By using a divider 120 to adjust the LO frequency clocking, the in-phase band mixer 124 this branch can be adjusted to receive desired frequency bands that can be used for lightning detection purposes using the in-phase radio path 111, 112, 113, 124, 125, 126 and 127.

In the normal symmetrical I/Q configuration the outputs 127 and 137 output digital DRM data from the I branch (124, 125, 126 and 127) respective the Q branch (134, 135, 136 and 137). For lightning detection purposes the branches can be adjusted to use different frequency bands as described. The blocks 125 respective 136 in the branch path contain adjustable gain means and filtering means needed before the data conversion by the ADC converter blocks 126 respective 136. The branch gain and filtering can be adjusted separately for each path in blocks 125 respective 135 before the data conversion by the analog to digital converter (ADC) 126 respective 136.

If one of the desired frequency bands is base-band, no frequency conversion at all will be needed for that branch and the mixer can be bypassed, using for example a switch 150. The other branch can still be used as described for lightning detection on a higher frequency band than base-band.

For such base-band lightning detection, a separate low frequency or inductive antenna 131 is in most cases required, and after optional filtering by the low pass filter 112 and after optional amplification or attenuation by the amplifier 113 the received base-band signal is directly fed using the selector switch 150 to the quadrature branch 135, 136 for additional amplification and filtering in the radio path before data conversion by the Q branch ADC 136. The digital output signal 137 from the base-band detection can thereafter be further processed by the lightning detection processing means. The digital output 127 from the higher frequency band detection is simultaneously available for the same processing means in order to extract information about the lightning strike.

Figure 6:
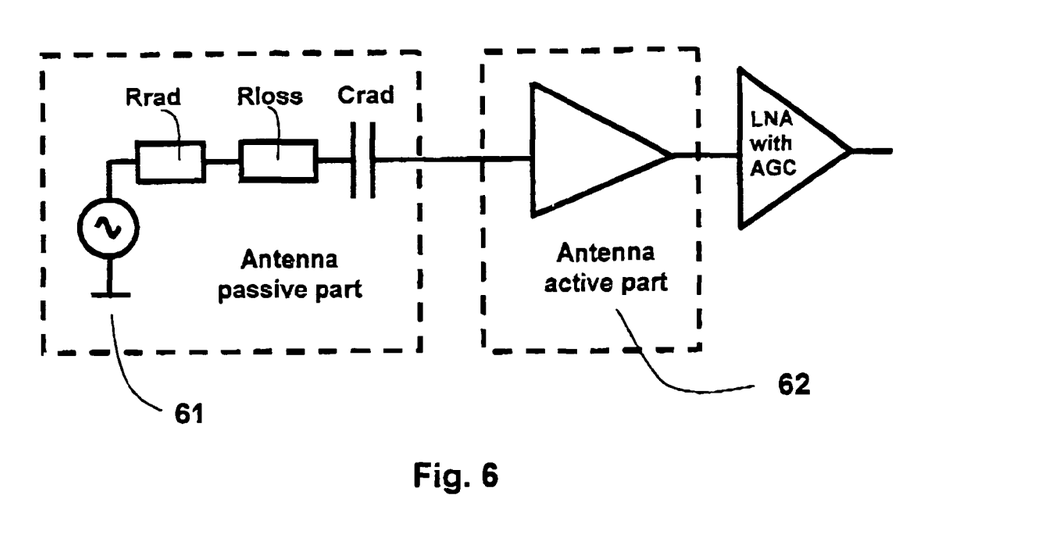
FIG. 6 presents a block diagram of a front-end of the present invention.
Figure 7:
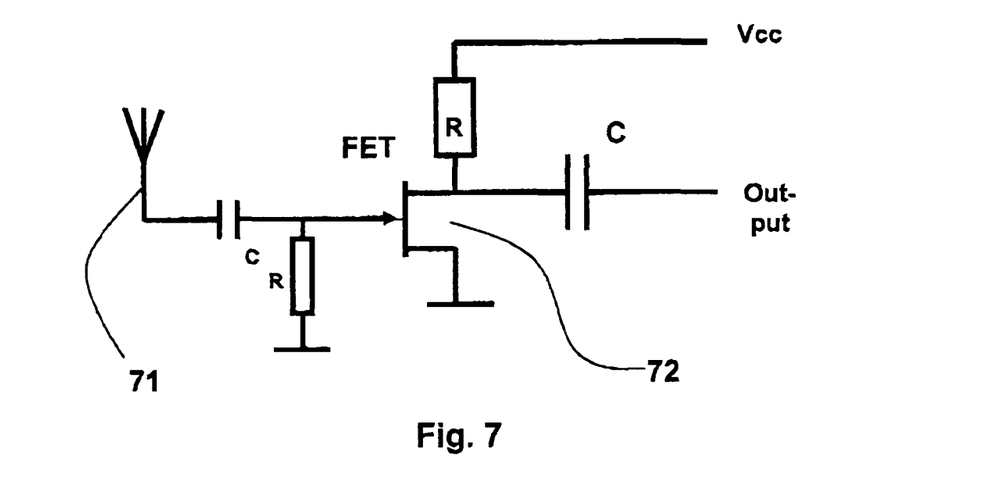
FIG. 7 presents a front-end preamplifier.

An antenna coil similar to 111 in FIG. 11 is shown in FIG. 6 in a more complex form. This antenna coil 61 forms the passive part of an antenna having a 10 kHz center frequency followed by a gain stage 62 in the active part of the antenna. No frequency down-conversion is needed because the bandwidth of the branch in use is sufficient. A pre-amplifier 72 as depicted in FIG. 7 can also be used if only a wire antenna 71 is available, e.g. a wire antenna integrated in the headset of a mobile phone. Here too, the antenna is shown followed by a simple gain stage 72.

The I and Q branches can as well be used so that the bandwidth of the channel filters may be different. This kind of implementation gives more information about the lightning strikes and enables the utilization of the used channels in different detection modes. Large bandwidth for example maximizes the received energy and can advantageously be used for triggering mode. However, a channel with narrower bandwidth enables easier waveform analysis of the signal since the speed requirements of the base-band ADC converters is lower.

Figure 3:
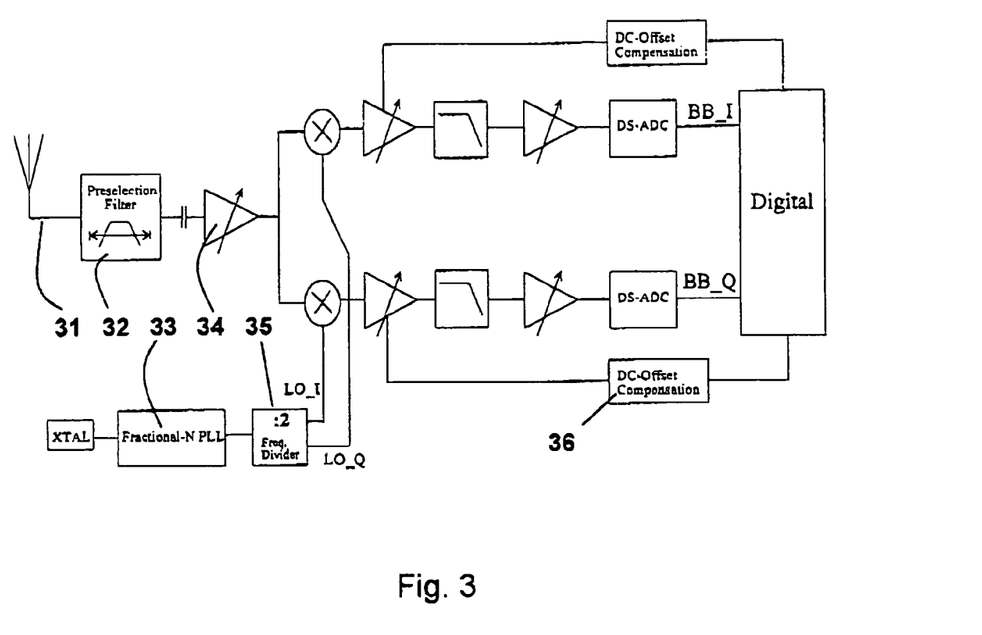
FIG. 3 presents a homodyne DRM receiver.
Figure 4:
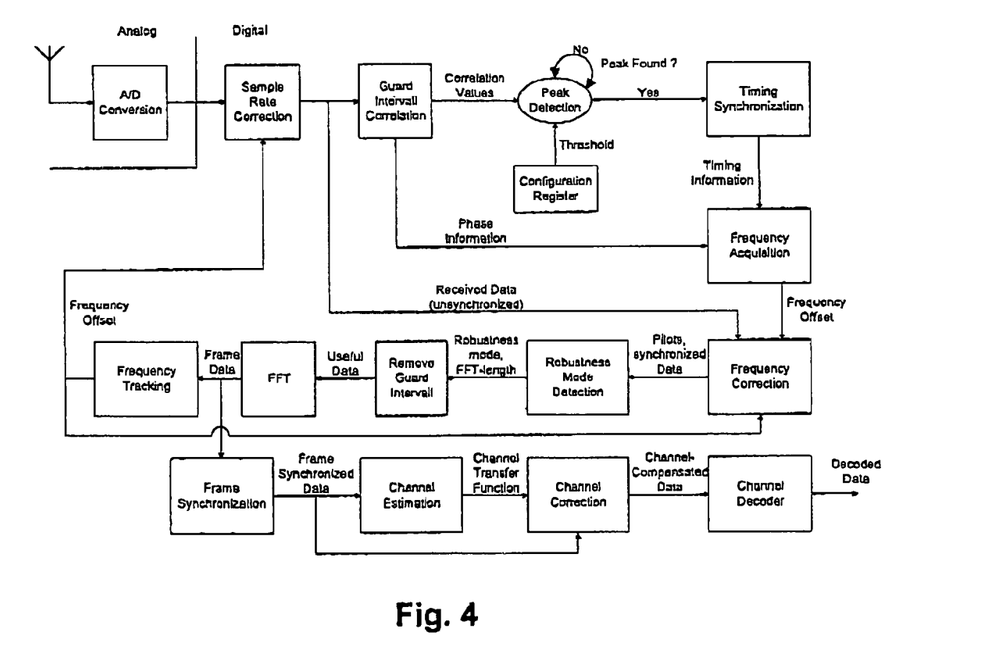
Figure 5:
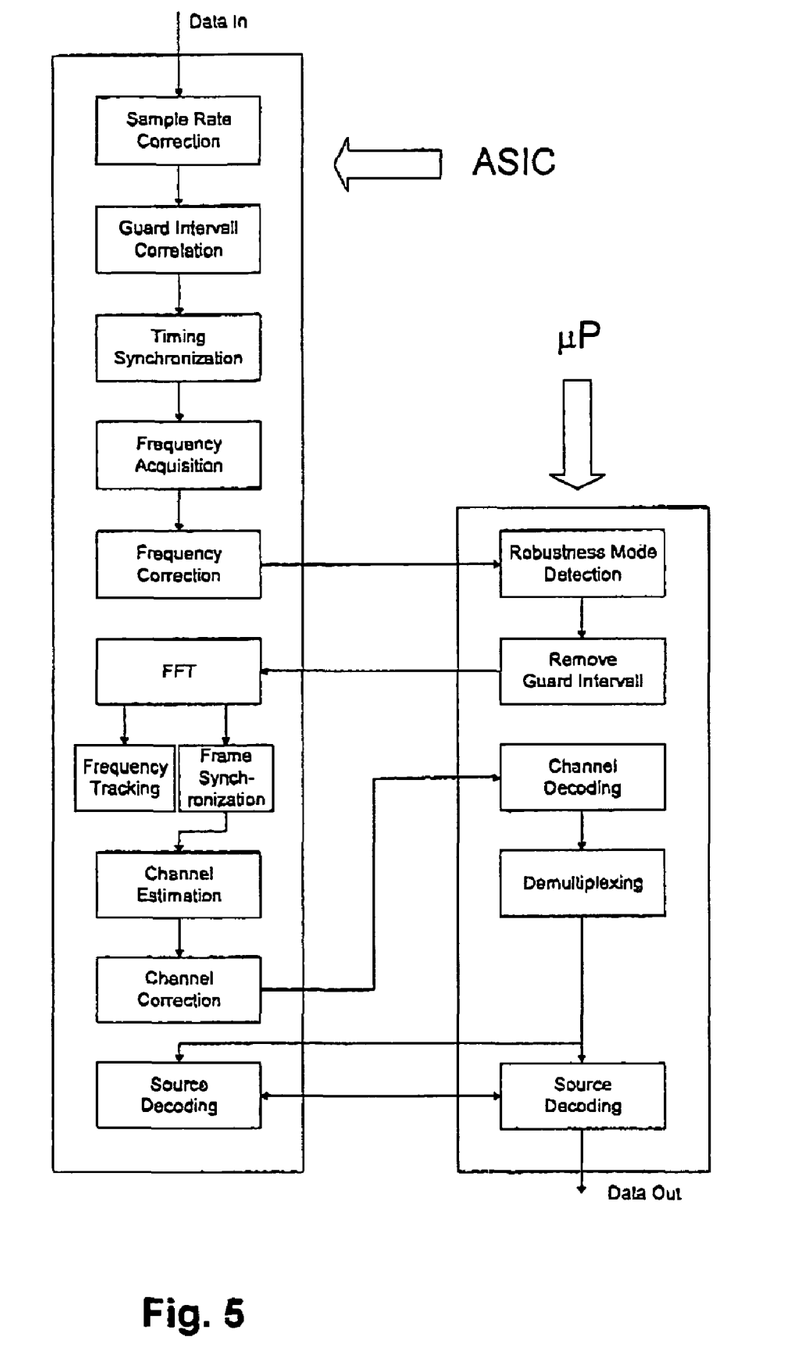

To enable a full monolithic integration for power and cost efficiency, the DRM analog front-end uses a homodyne topology, depicted in FIG. 3. The image rejection requirements are much more relaxed, as the intermediate frequency (IF) is zero, the image and the desired signal are the same. The dynamic offset problem caused by self-mixing effects can be digitally regulated with a dynamic DC-offset compensation loop 36 and a similar loop for the other branch. The received antenna 31 signal is preselected with a digitally controlled filter 32 to relax the linearity and the dynamic range requirements of the radio frequency (RF) Automatic Gain Control (AGC) 34. The RF-AGC 34 advantageously utilizes a high-ohmic and low-capacitance input stage so that it does not load the antenna 31.

A fractional-N counter 33 Phase Locked Loop (PLL) based controller is used to generate the needed variable local oscillator signals LO-I and LO-Q in FIG. 3 for channel selection over the whole DRM frequency band. The PLL 33 output signal is first divided by a factor of two by the output counter 35 in order to provide symmetrical outputs for each branch mixer and ensure correct gain and phase quadrature signals for the down-conversion mixing.

In each of the two base-band branches a channel low pass filter is used with an additional AGC before the $\Delta\Sigma$-ADC converter converts the DRM signal into digital form as the BB-I from the in-phase branch and as the BB-Q signal from the quadrature branch and these two digital signals are outputted to the hardware accelerator of the digital base-band part of the DRM receiver The digital base-band part consists of a hardware accelerator 22 in FIG. 2 for complex signal processing tasks, having its own local RAM memory and an embedded processor means 25, i.e. an ARM microprocessor, to run a dedicated AM base-band application software 23 and to control the data flow. Typically the DRM application software is stored in a nonvolatile memory 23 and run with the help of the main RAM memory 26 of the processing means 25.

The DRM receiver analog front-end 21 is capable of receiving AM signals up to a frequency of up to 30 MHz, including AM frequency bands not used for DRM broadcasting. The electromagnetic spectrum produced by the huge electric current flows produced by the lightning strikes can be received with the same analog front-end and this can provide the signals for a lightning detection application.

The present invention provides an AM application engine capable of handling two AM band applications for example in a mobile phone. A lightning detection AM band detection signal bypasses the hardware accelerator of the DRM receiver and is analyzed by the processing means 84 running the application software 83 in FIG. 8, typically ARM microprocessor compatible software. The inventive combined architecture for a DRM receiver with lightning detector shows the Digital baseband HW accelerator 82, having a local RAM memory, and the processing means 84 with the main RAM memory 85.

Figure 8:
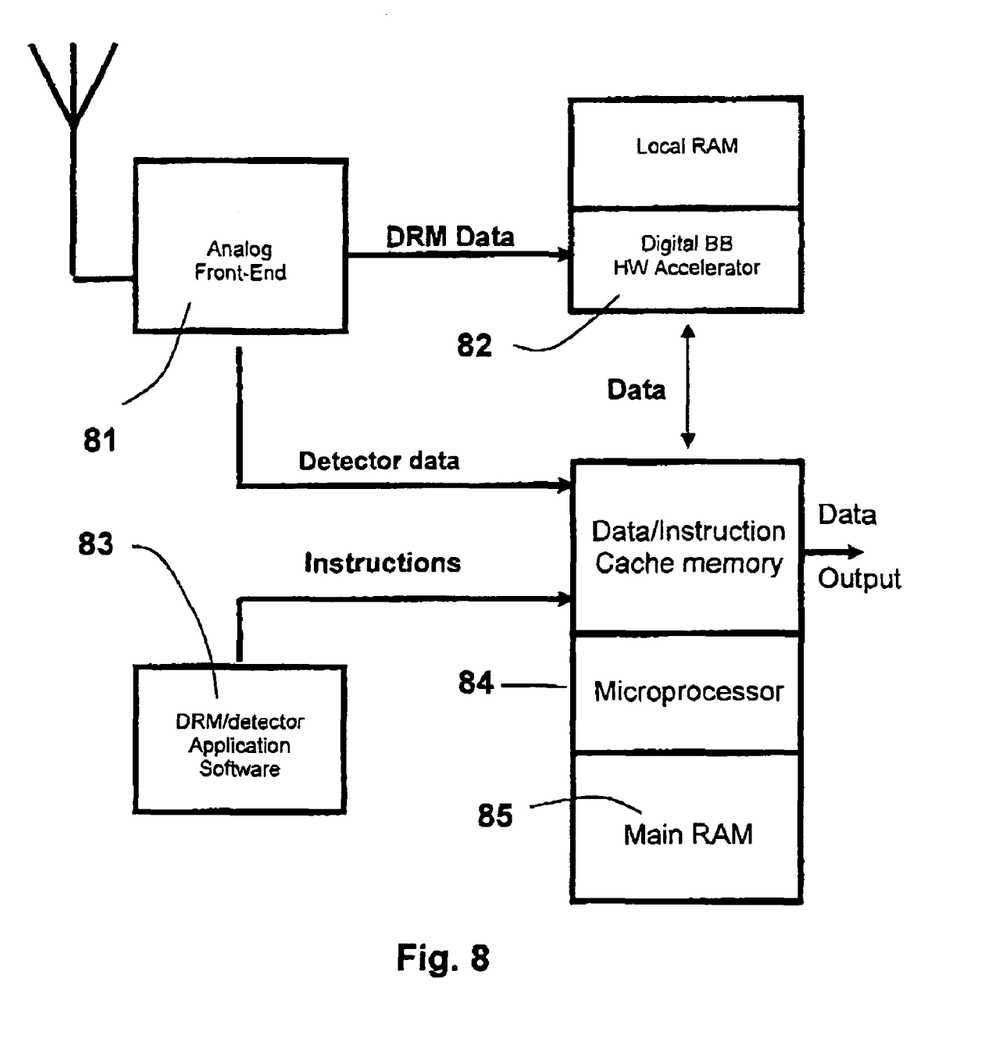
FIG. 8 presents the digital base-band architecture of a DRM receiver and a lightning detection according to the present invention, whereby data received by the common analog front-end bypasses the hardware accelerator and is directed directly to the processing means.
Figure 9:
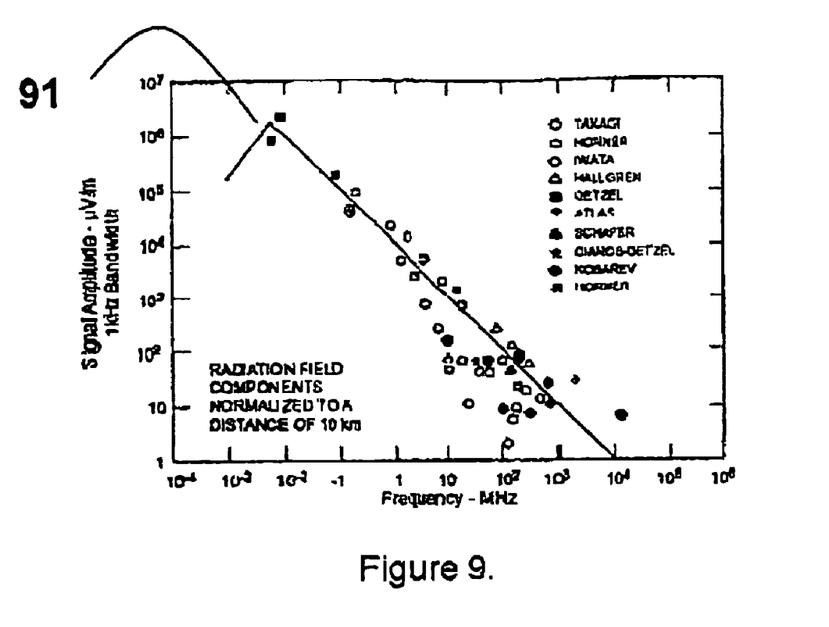
FIG. 9 is a graph showing lightning data.

The DRM receiver comprises an analog front-end 81, a base-band hardware accelerator 82 and a processing means 84, which means has a cache memory and a main RAM memory 85. Signals received by the analog front-end 81 are converted into the digital domain and processed by the hardware accelerator 82 and the microprocessor 84 running the software 83 with the help of the main RAM memory 85.

Certain tasks of the DRM receiver, for example synchronization and channel estimation, require higher computing power and are therefore performed by the hardware accelerator 82. This accelerator comprises a local RAM memory as shown in FIG. 8. Other tasks requiring less computing power and the data flow control can be handled by the processing means using its cache memory and the main RAM memory 85. Data exchange is handled by a bus system so the processing means 84 can read any outputted data under software 83 control. This software 83 is arranged to control both the DRM reception application as well as any other application, like the present lightning detection application.

The lightning detection receiver comprises an analog front-end 81 sending detector data directly to the processing means 84.

Both the signals from the lightning detection as well as the DRM data are converted into the digital domain but the lightning detection signals will bypass the hardware accelerator 82 of the DRM receiver. The microprocessor 84 will take instructions from the lightning detection application software 83 and process the received signals from the analog front-end marked as "Detector data" in FIG. 8.

The final implementation is a single chip implementation including an analog front-end, digital base-band hardware acceleration, an ARM microprocessor as processing means and external interfaces. The single chip implementation provides cost efficiency for the AM band engine.

Since the DRM receiver and the lightning detection use the same ARM microprocessor, those two applications are performed simultaneously.

The DRM receiver can also operate as a triggering device for another lightning indicator, whereby another lightning indicator may be a separate device or integrated to the mobile RF device. This arrangement results in an energy saving solution, as the other indicator can be switched off until the DRM triggers it into an active mode.

It is obvious to the person skilled in the art that different embodiments of the invention are not limited to the example described above, but that they may be varied within the scope of the enclosed claims.

The invention claimed is:

1. A lightning detector comprising:
   a Digital Radio Mondiale (DRM) digital broadcasting system receiver having an analog front-end and a digital base-band;
   wherein with the analog front-end DRM receiver the radio signal from lightning can be detected when a DRM receiver application and a lightning detection application operate in the same AM band application engine; and
   wherein a DRM receiver comprises an I/Q demodulator; wherein the in-phase and the quadrature branches of an I/Q demodulator based receiver are configured to be used in different modes.

2. A lightning detector according to claim 1, wherein a combined AM DRM broadcast receiver and lightning detector is integrated to a mobile RF device.

3. A lightning detector according to claim 2, wherein the mobile RF device is a mobile telecommunication terminal.

4. A lightning detector according to claim 1, wherein the DRM receiver is configured to use the analog front-end, a digital hardware accelerator and a processor, and the lightning detector is configured to use the analog front-end and an application software compatible with the processor.

5. A lightning detector according to claim 1, wherein the in-phase and quadrature branches of the I/Q demodulator based receiver are configured to process different frequency bands of the AM frequency range.

6. A lightning detector according to claim 1, wherein the DRM analog front-end has a homodyne topology.

7. A lightning detector according to claim 1, wherein the DRM receiver is a triggering device for another lightning indicator.

8. A method comprising:
a Digital Radio Mondiale (DRM) digital broadcasting system receiver having an analog front-end and a digital base-band;
wherein with the analog front-end DRM receiver the radio signal from lightning is detected while the DRM receiver and a lightning detection application both operate in the same AM band application engine; and
wherein a lightning detection AM band radio signal which is bypassing a DRM receiver's hardware accelerator is handled by application specific software running in the processor.

9. A method according to claim 8, wherein the DRM receiver uses the analog front-end, a digital hardware acceleration and a processor and that the lightning detector uses the analog front-end and the application running in said processor.

10. A method according to claim 9, wherein those applications are performed at the same time.

11. A method according to claim 8, wherein the DRM receiver operates as a triggering device for another lightning indicator.

12. A lightning detector comprising:
a Digital Radio Mondiale (DRM) digital broadcasting system receiver having an analog front-end and a digital base-band;
wherein with the analog front-end DRM receiver the radio signal from lightning can be detected when a DRM receiver application and a lightning detection application operate in the same AM band application engine; and
wherein a DRM receiver analog stage comprises an antenna, an input image preventing Low Pass filter, a low noise amplifier (LNA), the gain of which LNA can be adjusted, a RF mixer to downconvert the input signal with the help of a first local oscillator (LO) frequency, in order to selectively pass the selected channel through a channel filter and via an automatic gain controlling stage to I/Q mixers controlled by a second LO with quadrature outputs.

13. A method comprising:
a Digital Radio Mondiale (DRM) digital broadcasting system receiver having an analog front-end and a digital base-band;
wherein with the analog front-end DRM receiver the radio signal from lightning is detected while the DRM receiver and a lightning detection application both operate in the same AM band application engine; and
wherein the DRM receiver analog stage comprises an antenna, an input image preventing low pass filter, a low noise amplifier (LNA), the gain of which LNA can be adjusted, a RF mixer to downconvert the input signal with the help of a first local oscillator (LO) frequency, in order to selectively pass the selected channel through a channel filter and via an automatic gain controlling stage to I/Q mixers, controlled by a second LO with quadrature outputs.

14. A lightning detector according to claim 13, wherein by dividing the LO frequency for a demodulator mixer in one branch that branch can be used for lightning detection purposes on a frequency other than the DRM frequencies.

15. A lightning detector comprising:
a Digital Radio Mondiale (DRM) digital broadcasting system receiver having an analog front-end and a digital base-band;
wherein with the analog front-end DRM receiver the radio signal from lightning can be detected when a DRM receiver application and a lightning detection application operate in the same AM band application engine; and
wherein one of the desired frequency bands is base-band, and it comprises an antenna, a band pass filter, a low noise amplifier and the inphase and quadrature mixers that are clocked by a local oscillator having quadrature outputs.

16. A lightning detector according to claim 15, wherein the I branch respective the Q branch of the demodulator are configured to be used on different frequency bands.

17. A lightning detector according to claim 15, wherein when one branch is in use for lightning detection, the other branch can be used for additional base-band lightning detection without downconversion by the mixer by arranging a bypass switch for this purpose.

18. A method comprising:
a Digital Radio Mondiale (DRM) digital broadcasting system receiver having an analog front-end and a digital base-band;
wherein with the analog front-end DRM receiver the radio signal from lightning is detected while the DRM receiver and a lightning detection application both operate in the same AM band application engine; and
wherein one of the desired frequency bands is base-band, and that the method comprises the use of an antenna, a band pass filter, a low noise amplifier and the inphase and quadrature mixers of a I/Q demodulator clocked by a local oscillator.

19. A method according to claim 18, a divider is arranged to divide the local oscillator frequency that clocks one mixer of said I/Q demodulator.

20. A method according to claim 19, wherein the demodulator I/Q branches are used for different frequency bands.

21. A method according to claim 18, wherein the demodulator I/Q branches can be adjusted to use different path gain.

22. A method according to claim 18, wherein the demodulator I/Q branches can be adjusted to use different path filtering.

23. A method according to claim 18, wherein when one demodulator branch is in use for lightning detection, the other branch is used for additional base-band lightning detection without downconversion by arranging a mixer bypass switch for this purpose.

24. A method according to claim 23, wherein for base-band lightning detection a separate low frequency inductive antenna is used and after optional filtering by a low pass filter the received base-band signal is directly fed using the said mixer bypass switch to the input of one branch of the I/Q demodulator and the output after analog to digital conversion to a processor.

* * * * *